US010526918B2

(12) United States Patent
Eriksson et al.

(10) Patent No.: US 10,526,918 B2
(45) Date of Patent: Jan. 7, 2020

(54) ENGINE ARRANGEMENT (71) Applicant: VOLVO TRUCK CORPORATION, Göteborg (SE)

(72) Inventors: Pontus Eriksson, Helsingborg (SE); Johan Persson, Skurup (SE); Anders Hedman, Marstrand (SE)

(73) Assignee: Volvo Truck Corporation, Göteborg (SE)

( * ) Notice: Subject to any disclaimer, the term of this patent is extended or adjusted under 35 U.S.C. 154(b) by 79 days.

(21) Appl. No.: 15/557,139

(22) PCT Filed: Mar. 13, 2015

(86) PCT No.: PCT/EP2015/055347
§ 371 (c)(1),
(2) Date: Sep. 11, 2017

(87) PCT Pub. No.: WO2016/146152
PCT Pub. Date: Sep. 22, 2016

(65) Prior Publication Data
US 2018/0045075 A1 Feb. 15, 2018

(51) Int. Cl.
*F01D 25/16* (2006.01)
*F02B 39/00* (2006.01)
(Continued)

(52) U.S. Cl.
CPC ............ *F01D 25/16* (2013.01); *F01D 25/125* (2013.01); *F02B 37/18* (2013.01)

(58) Field of Classification Search
CPC ........ F01D 25/125; F01D 25/14; F01D 25/16; F04D 29/4206; F04D 29/584; F02B 37/18;
(Continued)

(56) References Cited

U.S. PATENT DOCUMENTS 4,199,950 A * 4/1980 Hakanson ................ F01M 5/00
123/179.31
4,339,922 A 6/1982 Navarro
(Continued)

FOREIGN PATENT DOCUMENTS

CN 101158307 A 4/2008
EP 1428999 A1 6/2004
(Continued)

OTHER PUBLICATIONS

International Search Report (dated Nov. 10, 2015) for corresponding International App. PCT/EP2015/055347.
(Continued)

*Primary Examiner* — Patrick D Maines
*Assistant Examiner* — Dapinder Singh
(74) *Attorney, Agent, or Firm* — WRB-IP LLP (57) ABSTRACT

An engine arrangement includes a first engine unit, a second engine unit and at least one member for fastening the second engine unit to the first engine unit. The first unit and the second unit include fluid ports for achieving a fluid flow between the first and second unit. The engine arrangement further includes a valve for opening and closing at least one of the fluid ports and the fastening member is moveably arranged relative to the first unit and second unit and is arranged to act on the valve.

23 Claims, 10 Drawing Sheets (51) Int. Cl.
*F01D 25/12* (2006.01)
*F02B 37/18* (2006.01)

(58) Field of Classification Search
CPC ........ F02B 39/005; F02B 39/14; F02B 67/10; F01M 2011/021; F01P 2060/12; Y02T 10/144
USPC ........................................... 60/605.3
See application file for complete search history.

(56) References Cited

U.S. PATENT DOCUMENTS

| | | | |
|---|---|---|---|
| 5,048,578 A | 9/1991 | Dorf et al. | |
| 5,392,604 A | 2/1995 | Nikula et al. | |
| 5,591,332 A | 1/1997 | Reid et al. | |
| 8,689,555 B2* | 4/2014 | Wong | F02B 39/005 123/41.31 |
| 2004/0083730 A1* | 5/2004 | Wizgall | F01D 25/14 60/614 |
| 2004/0168441 A1* | 9/2004 | Dumas | F01M 11/02 60/612 |
| 2004/0200215 A1* | 10/2004 | Woollenweber | F01D 15/10 60/407 |
| 2007/0144958 A1 | 6/2007 | Gilles et al. | |
| 2007/0169479 A1 | 7/2007 | Nicolle et al. | |
| 2008/0047891 A1 | 2/2008 | Roesgen | |
| 2009/0159520 A1 | 6/2009 | Loos | |

FOREIGN PATENT DOCUMENTS

| | | |
|---|---|---|
| WO | 2004014515 A1 | 2/2004 |
| WO | 2009149706 A2 | 12/2009 |
| WO | 2014141886 A1 | 9/2014 |

OTHER PUBLICATIONS

Chinese Official Action (dated Mar. 29, 2019) for corresponding Chinese App. 201580077491.2.

* cited by examiner

FIG. 11a  FIG. 11b

ENGINE ARRANGEMENT

BACKGROUND AND SUMMARY

The invention relates to an engine arrangement. More particularly the present invention relates to a turbine arrangement of which a turbo unit is configured to be attached to an engine structure of the internal combustion engine.

The invention can be applied in heavy-duty vehicles, such as trucks, buses and construction equipment. Although the invention will be described with respect to a truck, the invention is not restricted to this particular vehicle, but may also be used in other applications utilizing turbo units such as aero or marine systems.

A turbo unit is a vehicle component used together with an associated internal combustion engine, typically a diesel engine. One example of a turbo unit is a turbocharger unit being configured to recover a part of the energy of the exhaust gas and to use that energy to compress intake air flowing into the combustion chamber of the internal combustion engine. Turbocharger units are commonly provided for increasing the efficiency and power of the internal combustion engine.

A turbocharger unit has three main components; a turbine for converting energy of the exhaust gas flow tee a rotational movement of the turbine, a compressor rotationally connected to the turbine for compressing intake air, and a housing enclosing the turbine and the compressor as well as a rotating shaft, bearings, etc.

During operation the turbocharger unit is mounted to the cylinder head by connecting an exhaust gas inlet of the turbine side with a manifold of the internal combustion engine. One such example is shown in US2003005694, wherein the manifold has a flange for cooperation with a corresponding flange surface of the turbocharger unit. Sleeves are extending from the manifold flange, arranged at one side of the manifold, to the opposite side of the manifold, in which sleeves fastening screws are guided for the fastening of the turbocharger unit. The solution proposed in US2003005694 is taught to provide a simple and easily accessible mounting or demounting, of the turbocharger unit.

However, the turbocharger unit must not only receive exhaust gas flow from the internal combustion engine in order to operate, but fluid connections are also necessary for providing lubrication, and in some cases also cooling, of the rotating pans within the turbocharger unit. For this the housing of the turbocharger unit has one or more fluid ports which must be connected to corresponding ports of the internal combustion engine, for example for providing lubrication oil and cooling water to the turbocharger unit. Especially, when a turbocharger unit is removed for maintenance or replacement fluid may spill out and mix if the fluid ports are not closed properly. There is thus a need for an improved engine arrangement for reducing the risk for undesired fluid mixing and waste.

It is desirable to provide an engine arrangement overcoming the above mentioned, drawbacks of prior art systems.

By the provision of the valve being operable to close one of the fluid ports automatically when a second engine unit is removed from a first engine unit unintentional spill or mix of fluids is avoided. In particular, the valve ensures that the fluid port(s) is closed unless the second engine unit is securely attached to the first engine unit. During mounting of the second engine unit to the first engine unit the valve will open only once the second engine unit is securely attached, thus allowing fluid to flow from the first engine unit to the second engine unit. Correspondingly, during dismounting of the second engine unit from the first engine unit the valve will close before the second engine unit is actually removed from the first engine unit, thus preventing fluid to flow out from the first engine unit when the second engine unit is removed.

An engine arrangement is therefore provided, comprising a first engine unit, a second engine unit and at least one member for fastening the second engine unit to the first engine unit. The first unit and the second unit comprise fluid ports for achieving a fluid flow between the first and second unit. The engine arrangement further comprises a valve for opening and closing at least one of the fluid ports, and the fastening member is moveably arranged relative to the first unit and second unit and being arranged to act on the valve.

In an embodiment, the valve comprises a fluid inlet being aligned with the fluid port of the first engine unit, and a fluid outlet being aligned with the fluid port of the second engine unit, and a valve member arranged inside a valve housing and being moveable between an open position and a closed position for controlling fluid flow between the fluid inlet and the fluid outlet. This is advantageous in that the valve member is protected by the valve housing, and in that the valve housing may be arranged between the first and second engine units.

In an embodiment the valve member comprises an engagement surface covering the fluid inlet or fluid outlet when the valve member is in its closed position, and wherein the valve member is arranged to move to its open position when the engagement surface is engaged by means of the fastening member when inserted into the fluid inlet or fluid outlet. Hence the valve is always closed when the second engine unit is dismounted from the first engine unit, thus ensuring that fluids will not escape or mix.

The valve member may be spring biased towards its closed position, for adding additional safety to the engine arrangement.

In an embodiment the engagement surface is a flat surface configured to receive a pressing force from the fastening member, and the valve member may be pivotally supported inside the valve housing or slidably supported inside the valve housing. A very simple and robust opening of the valve is thus achieved.

In another embodiment the valve member comprises a threaded bore configured to receive a threaded portion of the fastening member, which is advantageous in that the valve member may also form a counter surface for securing the position of the second engine unit relative the first engine unit.

In an embodiment the valve housing comprises means for attaching the valve to the first engine unit. Hence the second engine unit may be attached to the first engine unit via the valve, forming a robust connection between the first and second engine units.

In an embodiment the fluid inlet of the valve extends from an inlet support surface of the valve housing, said inlet support surface comprises sealing means for providing a fluid tight connection between the first engine unit and the valve. Leakage between the valve and the first engine unit is thus prevented.

In an embodiment the fluid outlet of the valve extends from an outlet support surface of the valve housing, said outlet support surface comprises sealing means for providing a fluid tight connection between the second engine unit and the valve. Leakage between the valve and the second engine unit is thus prevented.

In an embodiment the first engine unit is a cylinder block of an internal combustion engine, and the second engine unit is a turbo unit. The turbo unit may e.g. be a turbocharger unit, a turbocompound unit, a super compound unit, or a super charger unit.

The turbo unit may comprise a bearing housing having a surface at which the hearing housing is attachable to the cylinder block. This facilitates mounting of the turbo unit, and removes the need for separate fluid channels between the cylinder block and the bearing housing; these are instead rimed within the beating housing.

The valve may be arranged between the cylinder block, and the baring housing, and the fastening member may extend through the bearing housing. This is advantageous in that the turbo unit may be attached to the cylinder block by accessing the fastening member from a side of the turbo unit facing away from the cylinder block.

A valve for a turbo unit is also provided. The valve comprises a valve housing having a fluid inlet and a fluid outlet wherein one of the fluid inlet or outlet is arranged to be aligned with a fluid port of a first engine unit and the other of the fluid inlet or fluid outlet is arranged to be aligned with a fluid port of the turbo unit, and a valve member arranged inside the valve housing and being moveable between an open position and a closed position for controlling fluid flow between the fluid inlet and the fluid outlet. As mentioned above, the valve ensures that the fluid port(s) is closed unless the turbo unit is securely attached to the first engine unit. During mounting of the turbo unit to the first engine unit the valve will open only once the turbo unit is securely attached, thus allowing fluid to flow from the first engine unit to the turbo unit. Correspondingly, during dismounting of the turbo unit from the first engine unit the valve will close before the turbo unit is actually removed from the first engine unit, thus preventing fluid to flow out from the first engine unit when the turbo unit is removed.

The first engine unit may be a cylinder block of an internal combustion engine, whereby there is no need for additional fluid channels between the cylinder block and the turbo unit.

In an embodiment the valve member comprises an engagement surface covering the fluid inlet or fluid outlet when the valve member is in its closed position, and wherein the valve member is arranged to move to its open position when the engagement surface is engaged by means of a protrusive structure of the turbo unit inserted into the fluid inlet or fluid outlet. Automatic closing of the valve when the turbo unit is removed is thus achieved.

The valve member may be spring biased towards its closed position, thus providing additional safety relating to automatic closing and prevention of waste or mixing of fluids inside the cylinder block.

In an embodiment the engagement surface is a flat surface configured to receive a pressing force from the protrusive structure. The valve member is pivotally supported inside the valve housing or slidably supported inside the valve housing.

In another embodiment the valve member comprises a threaded bore configured to receive a threaded portion of a fastening member forming the protrusive structure.

In an embodiment the valve housing comprises means for attaching the valve to the first engine unit.

In an embodiment the fluid inlet extends from an inlet support surface of the valve housing, said inlet support surface comprises sealing means for providing a fluid tight connection between the first engine unit and the valve. The fluid outlet may extend from an outlet support surface of the valve housing, said outlet support surface comprises, sealing means for providing a fluid tight confection between the turbo unit and the valve. The valve housing may be provided with a seal, such as an O-ring.

A turbine arrangement is also provided, comprising a turbo unit, said turbo unit including a turbine shaft supporting a turbine, a bearing housing enclosing said turbine shaft, the bearing housing comprising means for fastening the turbo unit to a first engine unit, wherein the first engine unit comprises a fluid port being in fluid communication with a fluid port of the bearing housing when the turbo unit is attached to the first engine unit. The turbine arrangement further comprises a valve for opening and closing at least one of the fluid ports. The bearing housing may be provided with a seal, such as an O-ring.

In an embodiment the first engine unit is formed by a cylinder block of an associated internal combustion engine.

In an embodiment the bearing housing comprises a protrusive structure being inserted in the fluid port of the first engine unit when the turbo unit is attached to the first engine unit. The protrusive structure is arranged to act on the valve.

In an embodiment the protrusive structure is a fastening member for attaching the turbo unit to the first engine unit.

The valve may be a valve in accordance with the second aspect described above.

A method for opening a valve of an engine arrangement is also provided. The engine arrangement comprises a first engine unit, a second engine unit, and at least one member fin fastening the second engine unit to the first engine unit. The method comprises: aligning a fluid port of the first engine unit with a fluid port of the second engine unit, and fastening the second engine unit to the first engine unit by moving the fastening member relative the first engine bruit and the second engine unit, whereby the valve is opened due to movement of the fastening member.

A method for opening a valve of a turbine arrangement is also provided. The turbine arrangement comprises a turbo unit, said turbo unit including a turbine shaft supporting a turbine, a bearing housing enclosing said turbine shaft, said hearing housing comprising means for fastening the turbo unit to a cylinder block of an associated internal combustion engine. The method comprises: aligning a fluid port of the cylinder block with a fluid port of the bearing housing, and opening the valve by fastening the bearing housing to the cylinder block.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
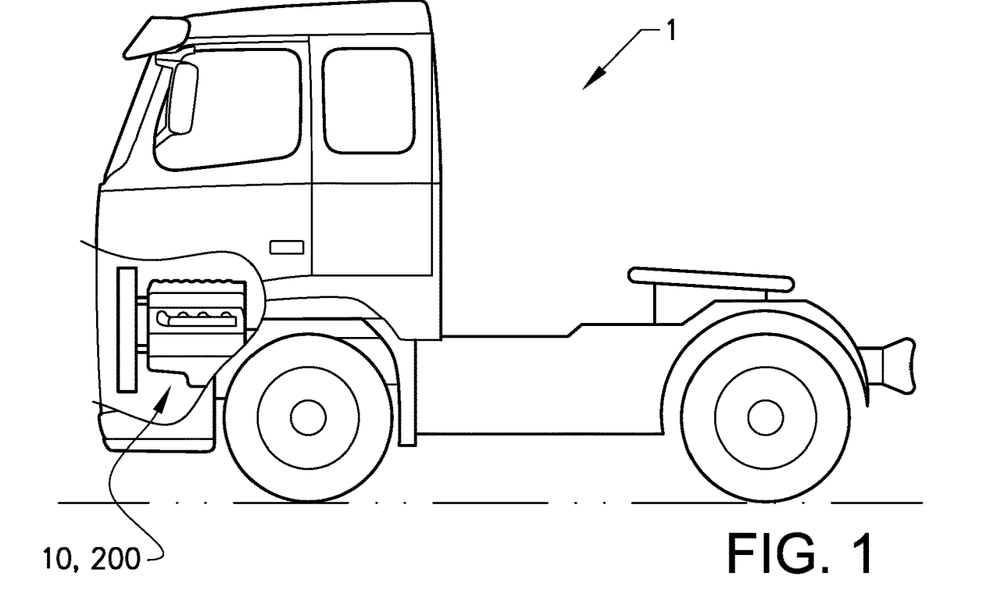
FIG. 1 is a side view of a vehicle according to an embodiment.

Starting with FIG. 1 a vehicle 1 is shown. The vehicle 1, which is illustrated as a truck, has an internal combustion engine 10 for driving the vehicle 1. As will be further explained below the internal combustion engine 10 of the vehicle 1 is provided with an engine arrangement comprising an engine unit 200 in the form of a turbo unit according to various embodiments. The vehicle 1 may have additional propulsion units, such as electric drives etc. as long as it has at least one engine 10 providing a flow of exhaust gases interacting with the turbo unit 200. Hence the vehicle 1 is not exclusively a truck but may also represent various vehicles such as buses, constructional equipment, etc.

Figure 2:
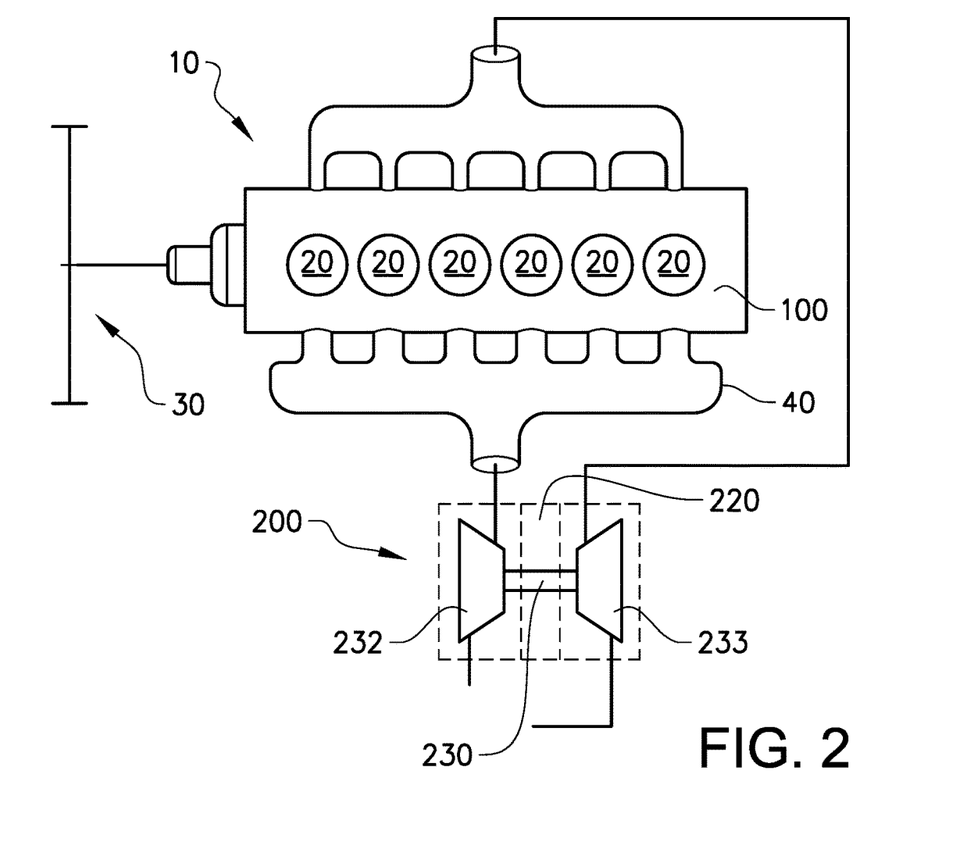
FIG. 2 is a schematic view of an internal combustion engine according to an embodiment.

In FIG. 2 an example of an internal combustion engine 10 is shown. The internal combustion engine 10 includes a plurality of cylinders 20 operated to combust fuel, such as diesel or gasoline, whereby the motion of pistons reciprocating in the cylinders 20 is transmitted to a rotation movement of a crank shaft 30. The cylinders 20 are provided in a cylinder block 100, and the crank shaft 30 is further coupled to a transmission (not shown) for providing a torque to driving elements (not shown). In case of a heavy vehicle, such as a truck, the driving elements are wheels; however the internal combustion engine 10 may also be used for other equipment such as construction equipment, marine applications, etc.

The internal combustion engine 10 further comprises an exhaust gas system, which system serves the purpose of recovering at least some of the energy in the exhaust gas flow to improve the performance of the internal combustion engine 10. In the shown example the exhaust vas exits the cylinders 20 and enters an exhaust manifold 40 which is further connected to an exhaust inlet of a turbo unit 200. The turbo unit 200 is e.g. a turbocharger unit, having a bearing housing 220 in which a turbine shaft 230 is rotatably supported. A turbine 232 is attached to one end of the turbine shaft 230. The exhaust gas flow causes the turbine 232 to rotate, which rotation is translated via the turbine shaft 230 to a corresponding rotation of a compressor 233 being used to compress incoming air before it is introduced in the cylinders 20. The basic structural as well as functional specifications of a turbocharger unit 200 are well known in the art and will not be described in full details.

Figure 3:
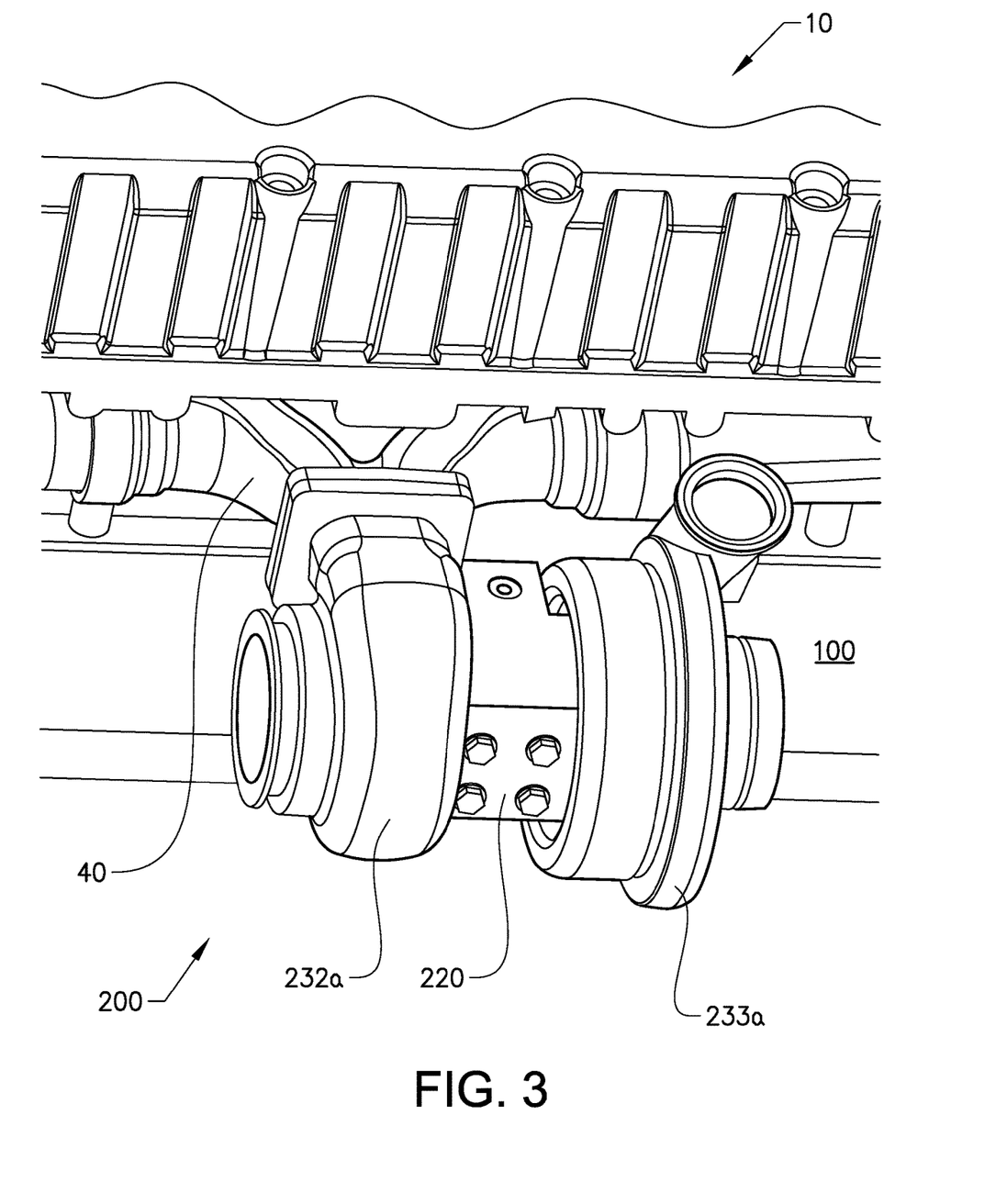
FIG. 3 is an isometric view of a turbo unit being attached to a cylinder block via an engine structure according to an embodiment.

Now turning to FIG. 3 an embodiment of a turbo unit 200 is shown. The turbo unit 200, here being represented by a turbocharger unit, is attached to a cylinder block 100 of an internal combustion engine 10 via a bearing housing 220. The bearing housing 220, either integrally formed or formed by at least two connected parts, is provided between a turbine housing 232a and the compressor housing 233a. The bearing housing 220 forms a support for bearings, in order to allow the turbine shaft 230 to rotate with a minimum of friction and vibration.

As can be seen in FIG. 3 the turbocharger unit 200 is connected to the cylinder block 100 of the internal combustion engine 10 by means of the bearing housing 220. In an embodiment the bearing housing 220 may be attached to an adapter (not shown) forming an interface between the bearing housing 220 of the turbocharger unit 200 and the cylinder block 100 of the internal combustion engine 10. In addition to this an exhaust inlet of the turbocharger unit 200 is connected to an exhaust outlet of the manifold 40, e.g. by means of flexible johns such as bellows, lip seal, etc.

Figure 4:
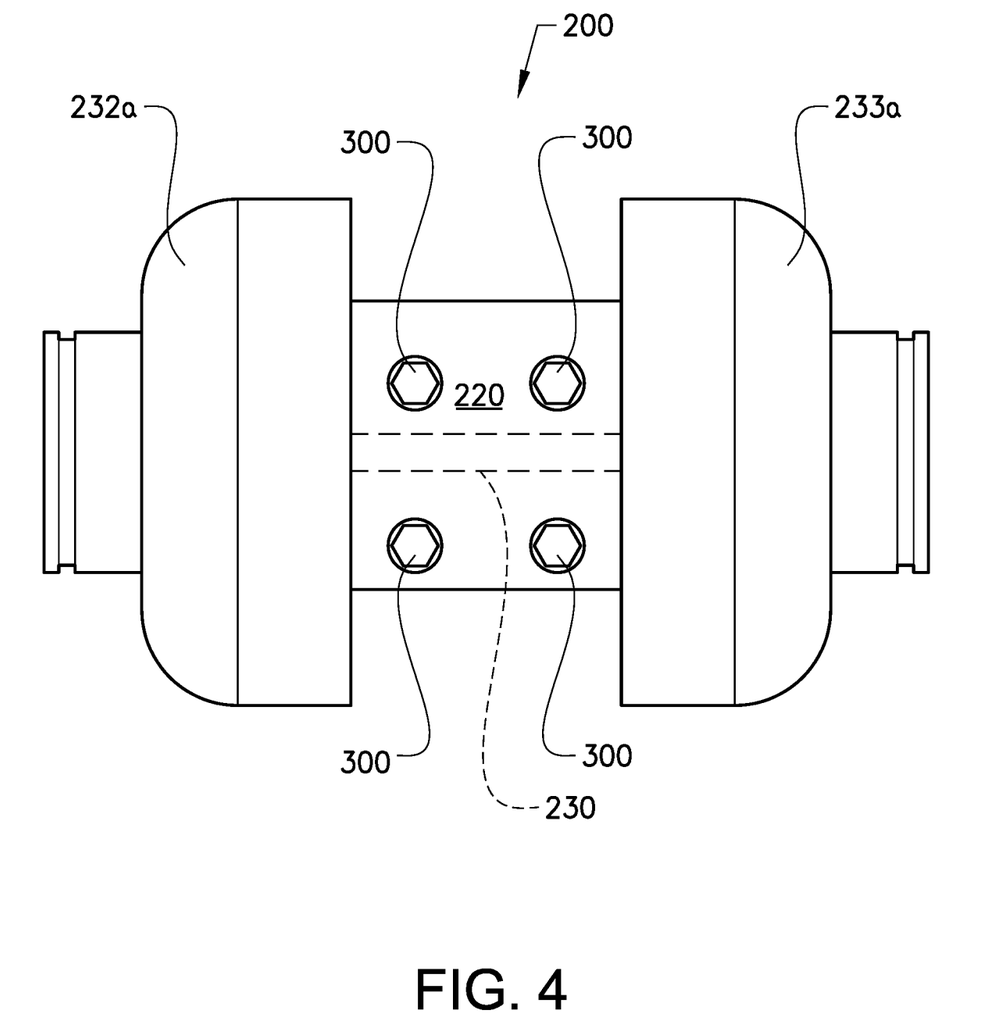
FIG. 4 is a font view of a turbo unit according to an embodiment.

Now turning to FIG. 4 a schematic view of a turbocharger unit 200 is shown, comprising the hearing housing 220 enclosing the turbine shaft 230, as well as the turbine housing 232a enclosing the turbine 232 and the compressor housing 233a enclosing the compressor 233. The turbocharger unit 200 further comprises fastening means 300 provided for fastening the turbocharger unit 200 to a cylinder block 100. As can be seen in FIG. 4 the fastening means 300 comprises one or more fasteners, such as screws, bolts, or studs received in a plurality of openings in the bearing housing 220. Preferably the openings extend towards the cylinder block 100. With reference to the embodiment of FIG. 4 showing four openings, all openings are positioned axially between the turbine housing and the compressor housing and on opposite sides of the shaft 230, preferably being arranged on equal distance from the upper openings and the lower openings shown FIG. 4. The openings extend in parallel and form through holes in the hearing housing 220. Hence, the openings has a first end on a first side of the bearing housing 220, which first side is configured to face the cylinder block 100, and a second end on a second side of the bearing housing 220, which second side is on an opposite side of the bearing housing 220 in relation to the first side. The turbocharger unit 100 may thus be attached to the cylinder block 100 via the bearing housing 220 by using the fasteners 300, such as screws, studs, bolts, etc received in said openings. As will be described below, one of the fasteners may be used to operate a valve 400 of an en engine arrangement according to various embodiment.

Figure 5A:
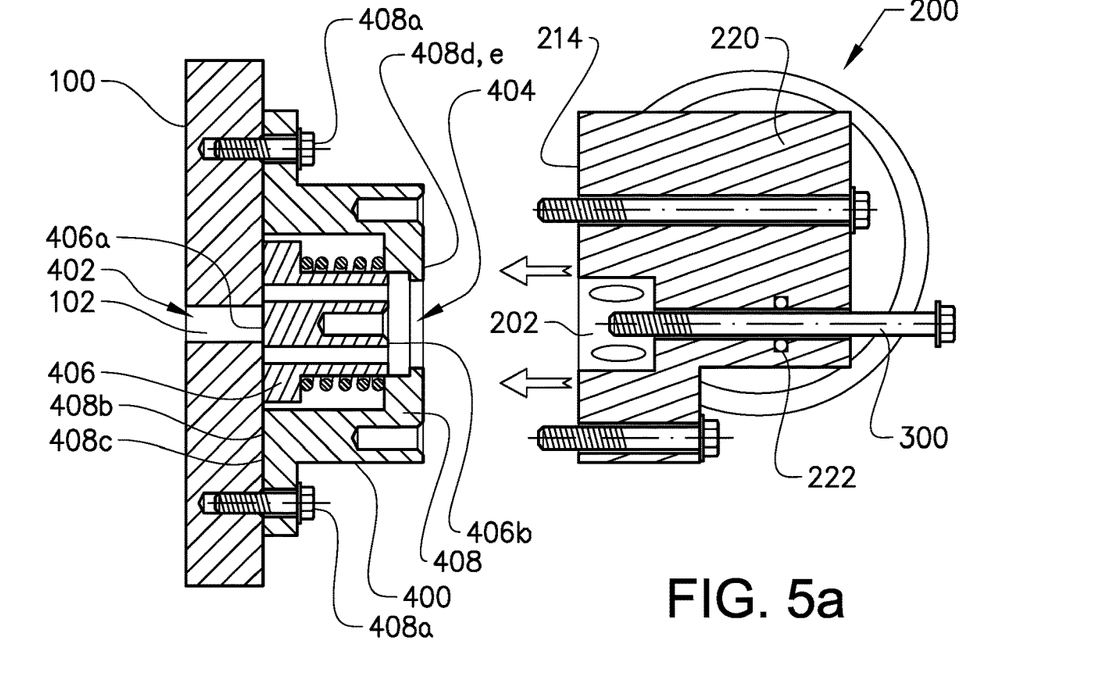
FIGS. 5a-c are cross-sectional views of an engine arrangement according to an embodiment.
Figure 5B:
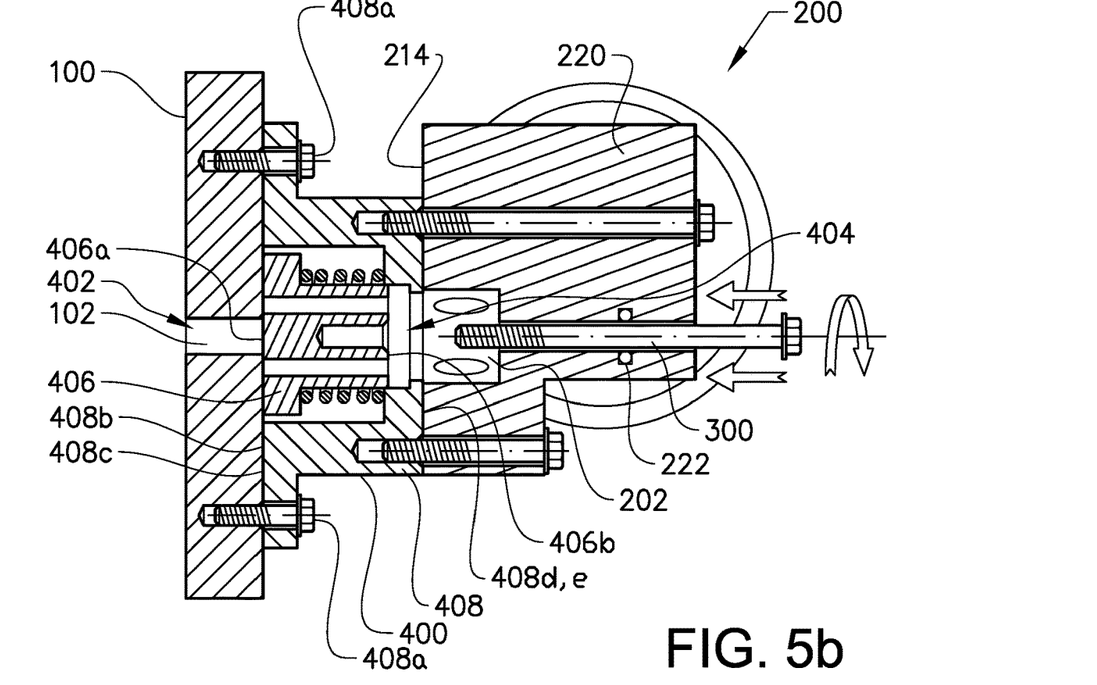
Figure 5C:
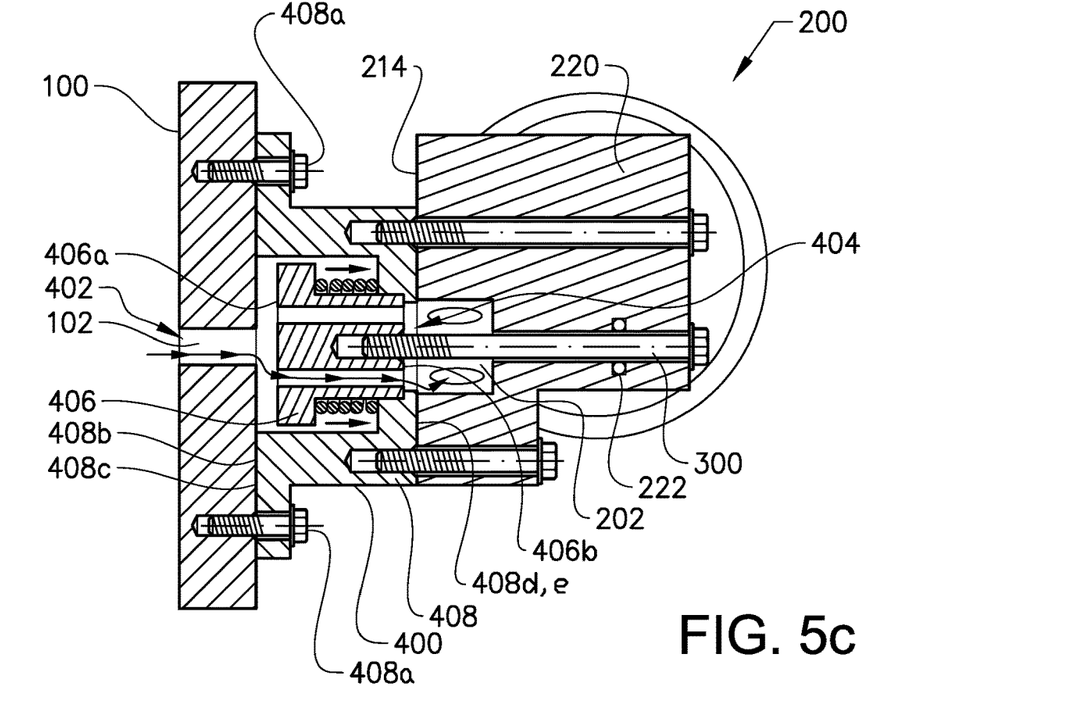

In FIGS. 5a-c an embodiment of an engine arrangement is shown. The engine arrangement comprises a first engine unit 100, a second engine unit 200, and at least one member 300 for fastening the second engine unit 200 to the first engine unit 100. With reference to the description relating to FIGS. 3 and 4 the first engine unit 100 may represent a cylinder block, the second engine unit 200 may represent a turbo unit in the form of a turbocharger unit, and the at least one member 300 may represent a fastener, such as a stud, screw, or bolt used for attaching the turbocharger unit 200 to the cylinder block 100 via the valve 400. Each one of the first unit 100 and the second unit 200 comprises fluid ports 102, 202 for achieving a fluid flow between the first and second unit 100, 200. The fluid port 102 of the first engine unit 100 may e.g. be a coolant outlet, and the fluid port 202 of the second unit 200 may be a coolant inlet. The engine arrangement further comprises a valve 400 for opening and closing at least one of the fluid ports 102, 202 automatically when the second engine unit 200 is dismounted from the first engine unit 100. In order to achieve this, the fastening member 300, preferably forming one of several attachment fasteners, is moveably arranged relative to the first unit 100 and second unit 200 and being arranged to act on the valve 400. The valve 400 may be a separate component being attached to the first engine unit 100 or the turbo unit 200. In other embodiments the valve 400 may be integrally formed with the first engine unit 100 or the second engine unit 200.

In some embodiments, valid for all different configurations of the valve 400 as presented herein, the valve 400 may be inserted into a recess of the first engine unit 100 or the second engine unit 200, in order to reduce the size of the engine arrangement as well as reducing the required sealings, since only one interface will be necessary to seal.

The second engine unit 200, i.e. the turbo unit, includes the bearing housing 220 having a surface 214 at which the bearing housing 220 is attachable to the cylinder block 100 via the valve 400. Hence, the valve 400 is arranged between the cylinder block 100 and the bearing housing 220. In case of coolant the fluid will thus cool rotating parts within the bearing housing 220. The bearing housing 220, the valve 400, and the cylinder block 100 may also be provided with additional fluid ports (not shown) for allowing a return flow of fluid. Hence a closed fluid circuit between the cylinder block 100 and the bearing housing 220 may be achieved.

In FIG. 5a three fastening members 300 are shown, each one extending through the bearing housing 220. At least one of these fastening members 300 is projecting into the fluid port 202 of the second engine unit 200 when the second engine unit 200 is mounted to the first engine unit 100. The fastening member 300 used for operating the valve 400 may extend through a bore of the bearing housing 220 being provided with a seal 222, such as an O-ring or similar.

The valve 400 comprises a valve housing 408 having a fluid inlet 402 and a fluid outlet 404. It should be realized that the ports may have opposite functionality, i.e. the fluid inlet may also represent a fluid outlet and vice versa depending on the flow direction between the first engine unit 100 and the second engine snit 200. The fluid inlet 402 is arranged to be aligned with the fluid port 102 of the first engine unit 100, e.g. the cylinder block, and the fluid outlet 404 is arranged to be aligned with the fluid port 202 of the second engine unit 200, e.g. the turbo unit. The valve 400 further comprises a valve member 406 arranged inside the valve housing 408 and being moveable between an open position and a closed position for controlling fluid flow between the fluid inlet 402 and the fluid outlet 404.

The fluid inlet 402 of the valve 400 extends from an inlet support surface 408b of the valve housing 408. Optionally, the inlet support surface 408b comprises sealing means 408c for providing a fluid tight connection between the first engine unit 100 and the valve 400. In a similar manner the fluid outlet 404 of the valve 400 extends from an outlet support surface 408d of the valve housing 408. The outlet support surface 408d is optionally provided with sealing means 408e for providing a fluid tight connection between the turbo unit 200 and the valve 400. In embodiments where the valve 400 is integrally formed with the first engine unit 100 or the second engine unit 200, the second engine unit 200, i.e. the turbo unit, may seal directly against the first engine 100, i.e. the cylinder block.

The valve 400 is preferably attached to the first engine unit 100 by fasteners, such as screws, bolts, studs, or similar. For this purpose the valve housing 408 comprises means 408a, such as fasteners and associated through holes, for attaching the valve 400 to the first engine unit 100.

The valve member 406 has an engagement surface 406a covering the fluid inlet 402 when the valve member 406 is in its closed position. Preferably, the valve member 406 is spring biased towards its closed position. As can be seen in FIG. 5a the valve member 406 comprises a threaded bore 406b configured to receive a threaded portion of the fastening member 300.

In order to attach the second engine unit, i.e. the turbo unit 200 to the first engine unit 100, i.e. the cylinder block 100 to which the valve 400 is already attached, the bearing housing 220 is aligned with the cylinder block 100. Fasteners are then tightened in order to secure the turbo unit 200 to the valve housing 400, and hence to the cylinder block 100. This is shown in FIG. 5b. Finally the fastening member 300, indicated by the reference numeral in FIG. 5a, is moved relative the turbo unit 200 such that it moves towards the valve 400. The fastening member 300 will then engage with the threaded bore 406b of the valve member 406 which then urges to an open position as the fastening member 300 is tightened. The valve member 406 will be pressed against an inside of the fluid outlet 404 leaving the valve 400 in an open position for allowing fluid to flow through the valve 400. This is shown in FIG. 5c.

As can be seen in FIG. 5c fluid flows into the valve 400, and through the valve member 406. For this interior channels are provided having inlets which are arranged at positions on the valve member being closed by the cylinder block 100 when the valve member 406 is in its closed position. Also, the interior channels have fluid outlets being in fluid communication with the fluid inlet 202 of the turbo unit 200.

When dismounting the turbo unit 200 from the cylinder block 100 the same procedure is performed but in a reversed order; initially the fastening member 300 is removed, or un-tightened, for allowing the valve member 406 to return to its closed position. The turbo unit 200 may thereafter be removed from the cylinder block 100 without any risk for fluid spill or mixing.

Figure 6:
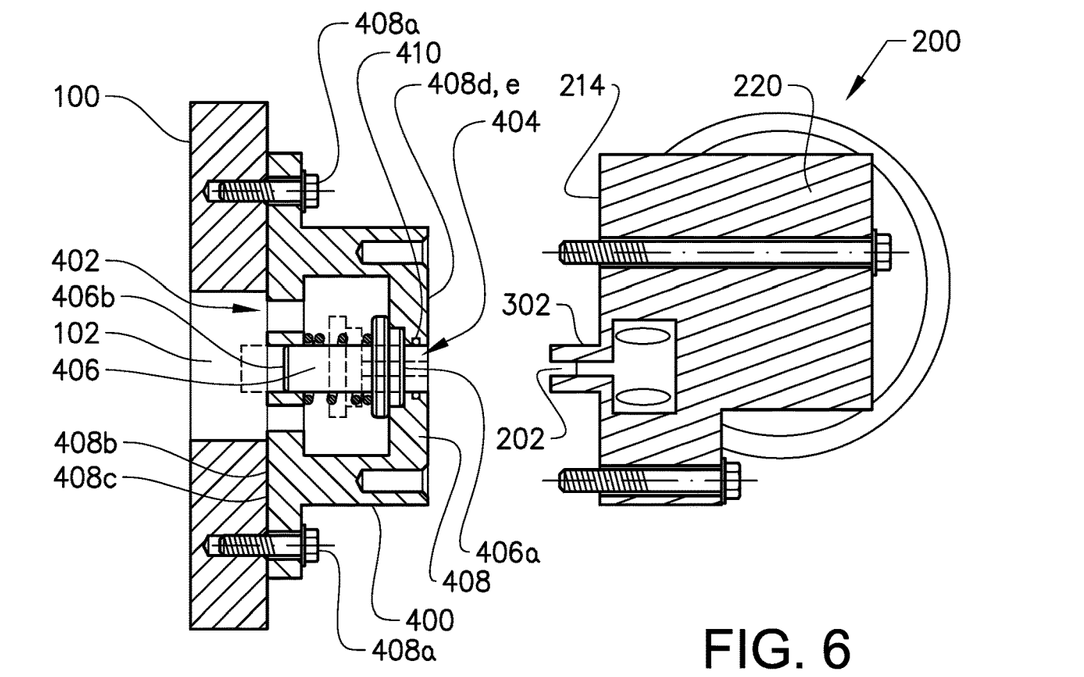
FIG. 6 is a cross-sectional view of an engine arrangement according to an embodiment.
Figure 7:
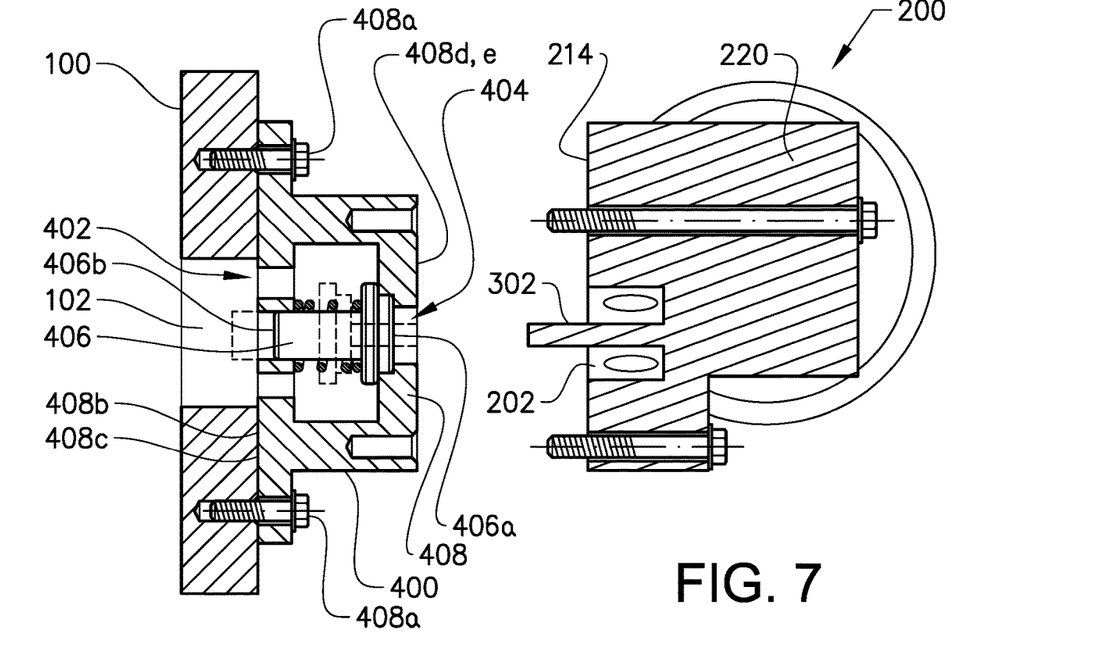
FIG. 7 is a cross-sectional view of an engine arrangement according to an embodiment.

Other embodiments of an engine arrangement are shown in FIG. 6 and FIG. 7. Here, no fastening member 300 is required to operate the valve into an open position. Instead, the valve member 406 is arranged to move to its open position when the engagement surface 406a is engaged by means of a protrusive structure 302 of the turbo unit 200 inserted into the fluid outlet 404. The fluid outlet 404 may for this purpose be provided with a seal 410, such as an O-ring or similar. In these embodiments the engagement surface 406a is a flat surface slidably supported inside the valve housing 408 and configured to receive a pressing force from the protrusive structure 302. In FIG. 6 the protrusive structure 302 is shown as a cylindrical member having a central bore for allowing fluid to flow therethrough. In FIG. 7 the protrusive structure 302 is shown as a rod-like member having fluid channels arranged around it, such that fluid may flow around the protrusive structure 300 once the valve 400 is opened.

Figure 8A:
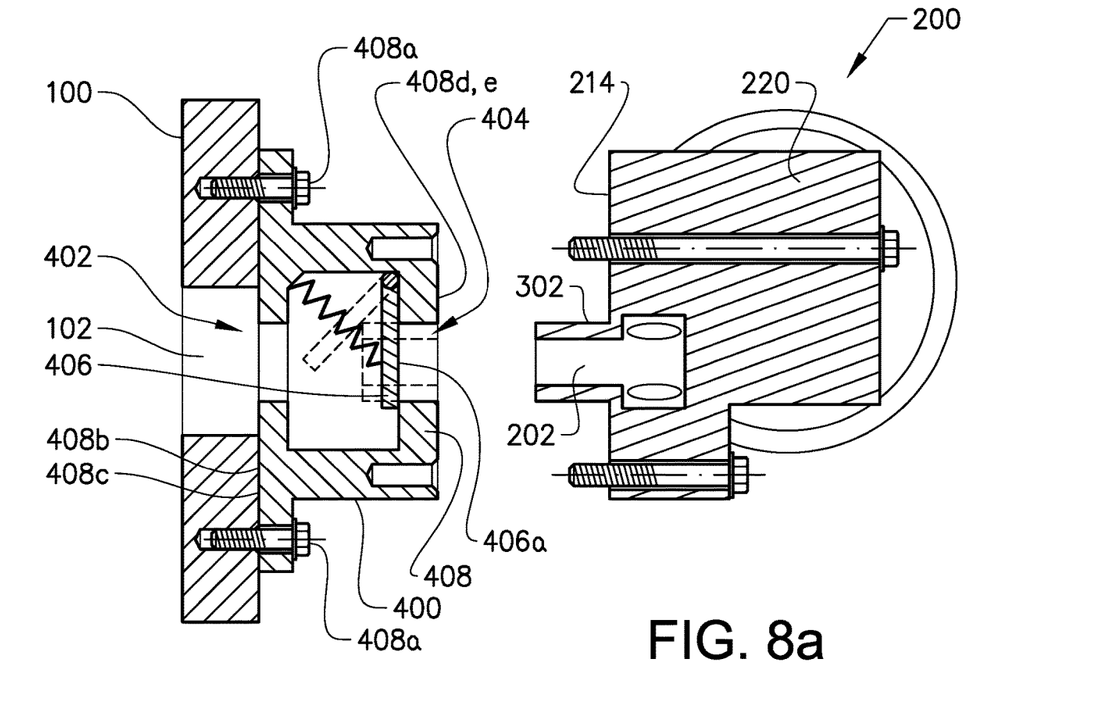
FIG. 8a-c are cross-sectional views of an engine arrangement according to various embodiments.

In FIG. 8a a yet further embodiment is shown in which the protrusive structure 302 corresponds to the embodiment shown in FIG. 6, but the valve member 406 is pivotally supported inside the valve housing 408 instead of being slidably supported. Hence when the protrusive structure 302 engages with the valve member 406 it will pivot backwards to open the fluid outlet 404 of the valve 400.

Figure 8B:
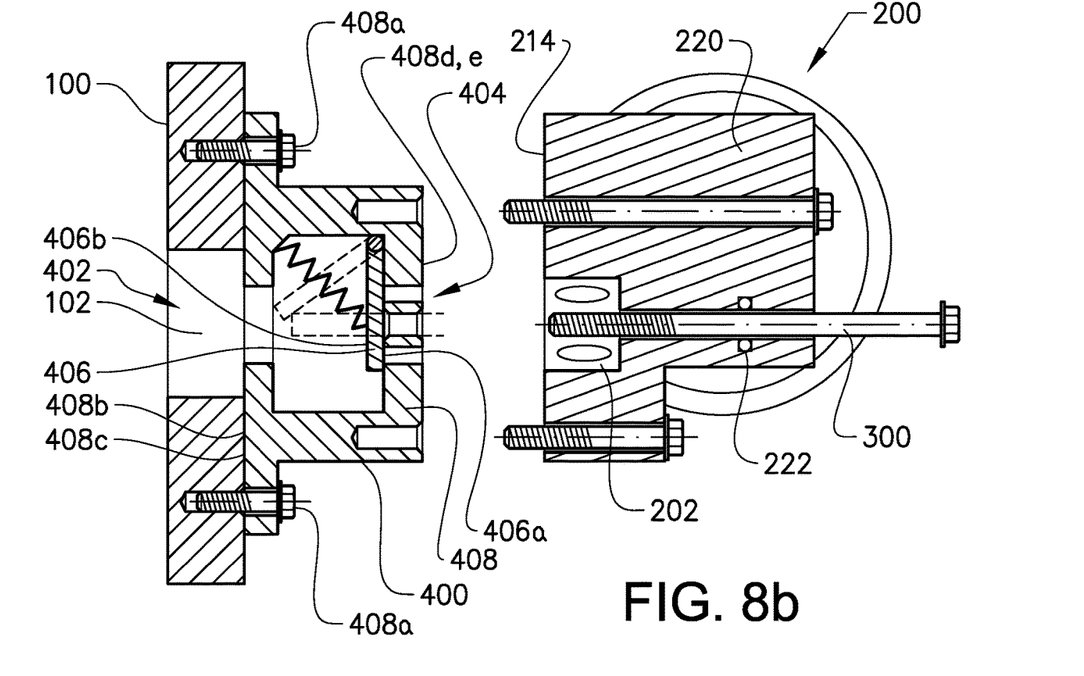

In FIG. 8b another embodiment is shown, wherein the valve 400 operates in the same manner as the valve 400 shown in FIG. 8a. However, opening of the valve 400 is achieved by the fastening member 300, which when inserted into the fluid port 404 of the valve 400 will engage with a threaded bore at the fluid port 404. As the fastening member 300 moves axially inwards the valve 400, the valve a ember 406 will be urged upwards by a pivoting movement for opening fluid channels arranged in the close proximity to the threaded bore.

Figure 8C:
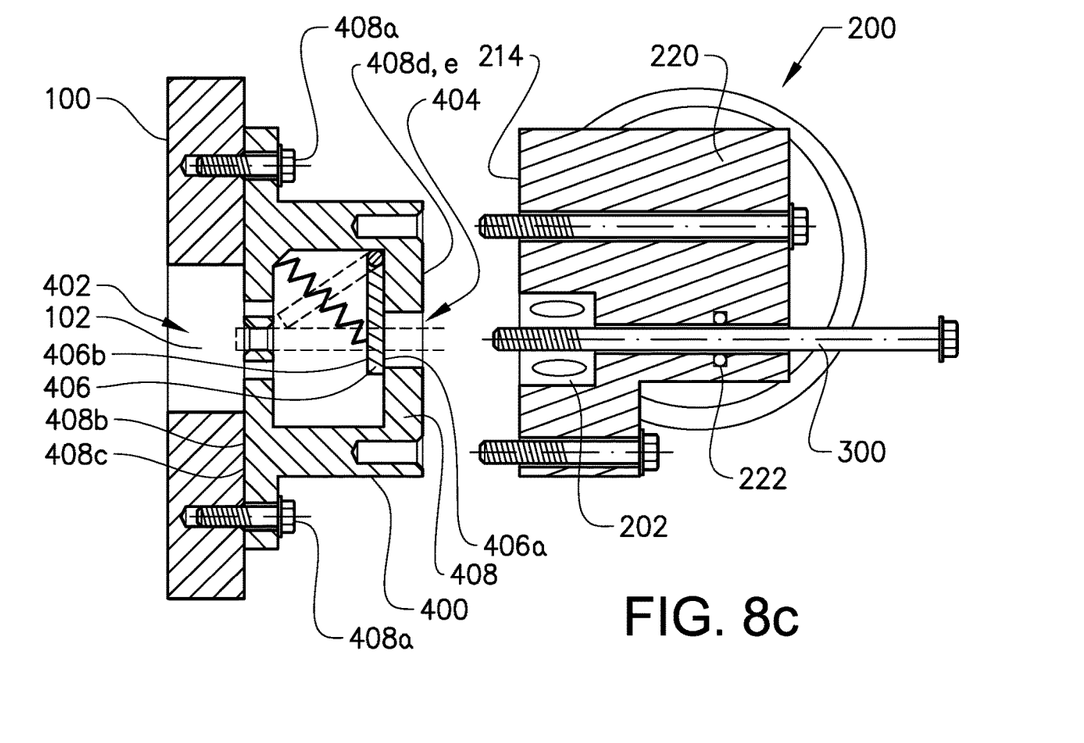

FIG. 8c shows a yet further embodiment being similar to the embodiment shown in FIG. 8b. However, the threaded bore and the adjacent fluid channels of the valve 400 are instead arranged at the fluid inlet 402, whereby the fastening member 300 will be inserted into the valve 400, pushing the valve member 406 in a pivoting movement for opening the fluid outlet 404 before the fastening member 300 engages with the threaded bore.

Figure 9A:
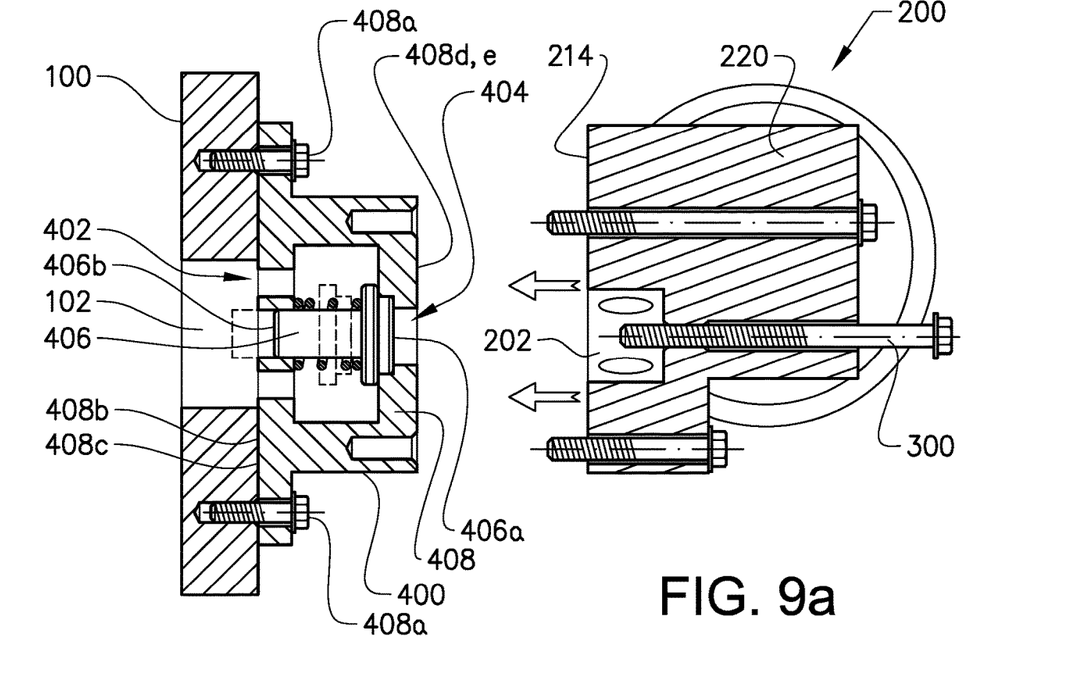
FIGS. 9a-c are cross-sectional views of an engine arrangement according to an embodiment.
Figure 9B:
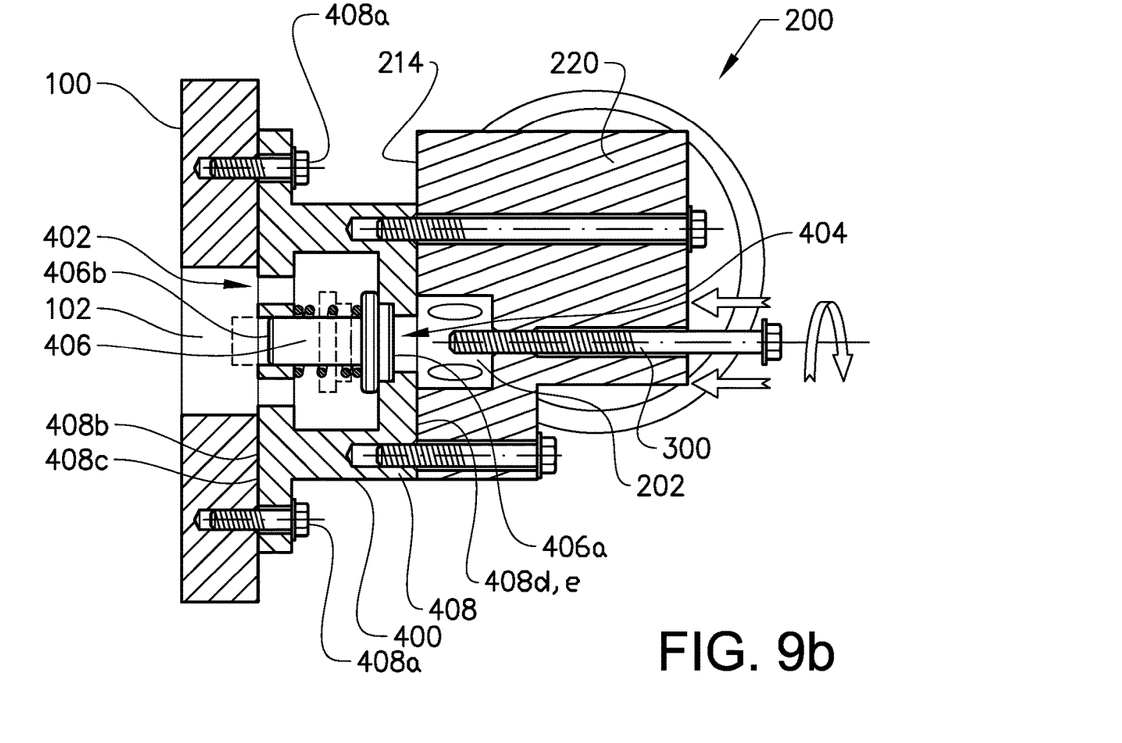
Figure 9C:
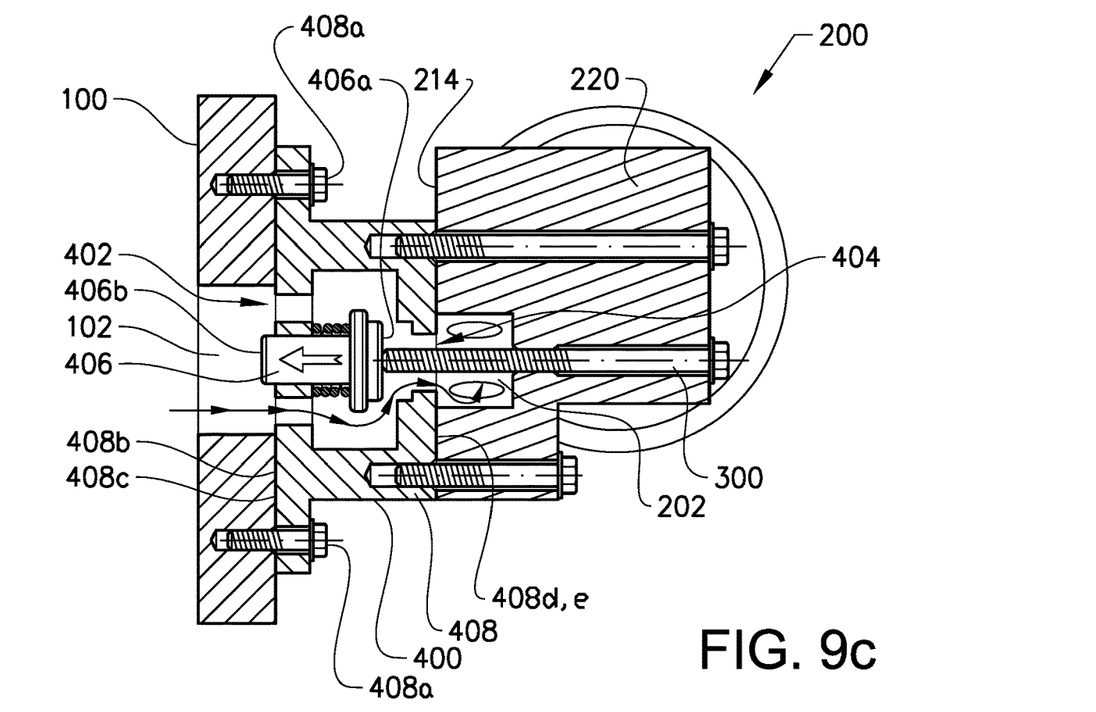

Another embodiment of an engine arrangement is shown in FIGS. 9a-c. In this embodiment the fastening member 300 is arranged to act on the valve 400. The valve 400 is identical with the valves 400 shown in FIGS. 6 and 7. As compared to the embodiment shown in FIGS. 5a-c, the fastening member 300 does not provide a pulling action of the valve member 406; instead the fastening member 300 engages with a threaded bore inside the hearing housing 220. When screwed into this threaded bore the fastening member 300 will protrude inside the fluid inlet 202 of the turbo unit 200, and eventually come into contact with the valve member 406. As the fastening member 300 is further tightened, the valve member 406 will be forced to move away from the fluid outlet 404 of the valve 400, thus opening the valve 400. Upon dismounting the turbo unit 200 from the cylinder block 100 the fastening member 300 is removed as a first step, closing the valve 400. After this the other fasteners may be unscrewed for allowing the turbo unit 200 to be removed without risking any fluid spill or fluid mixing.

Figure 10:
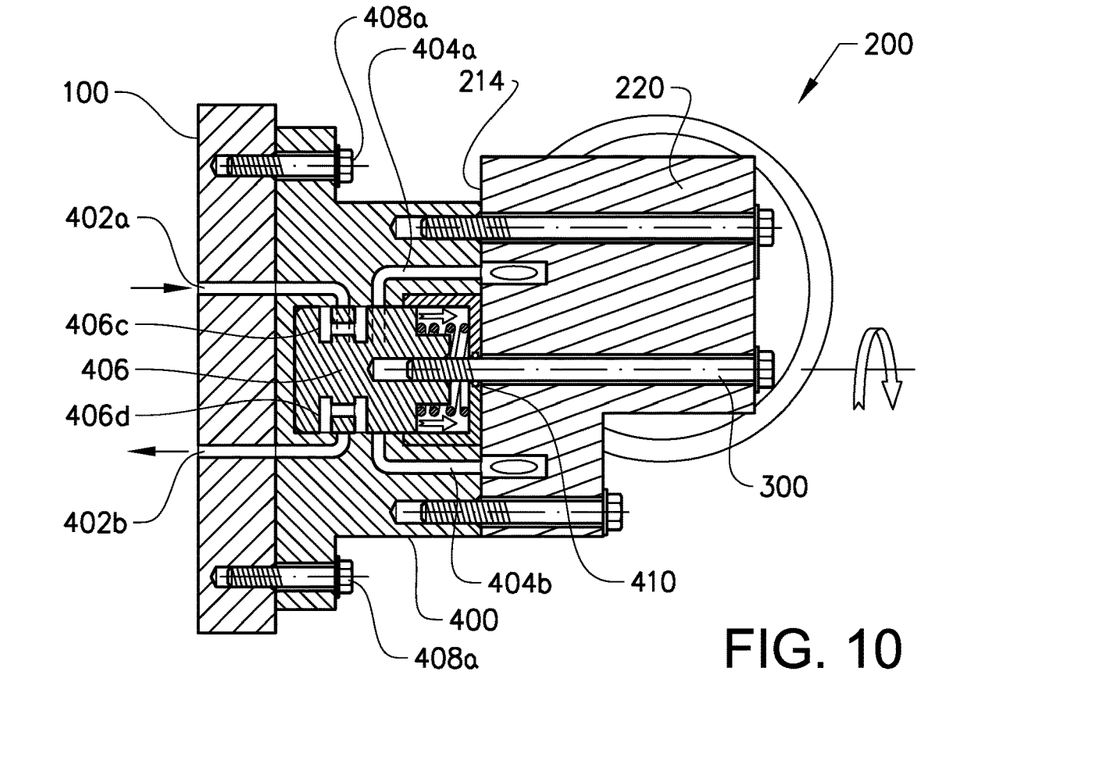
FIG. 10 is a cross sectional view of an engine arrangement according to a further embodiment.

In FIG. 10 another embodiment of an engine arrangement is shown. This embodiment shows a principle of having a single valve 400 to control opening and dosing of two or more fluid channels. The first engine unit 100, i.e. the cylinder block, has two fluid ports 402a, 402b being aligned with associated fluid channels of the valve housing 408. For example, port 402a may be used as a fluid outlet, while port 402b may be used as a fluid inlet receiving return flow. In an idle position, as indicated in FIG. 10, the valve member 406 of the valve 400 is closing the fluid channels inside the valve housing 408. However, when the fastening member 300 is tightened the valve member 406 will move towards the turbo unit 200, thus aligning fluid channels 406c,d inside the valve member 406 with the fluid channels of the valve housing 408, and hence allowing fluid to flow from the cylinder block 100 into the fluid channel 406c of the valve member 406. At the same time the fluid channels inside the valve member 406 will align with fluid channels 404a, 404b of the valve housing 408 being in fluid communication with the bearing housing 220. Hence, once the valve member 406 is urged towards the bearing housing 220 in the same manner as has been described with e.g. FIGS. 5a-c, the fluid will flow from the cylinder block 100 to the bearing housing 20, as well as back from the bearing housing 220 to the cylinder block 100. As is evident, more than two fluid ports of the first engine unit 100 may be controlled using only one valve member 406, as several fluid channels 406c, 406d may be provided inside the valve member 406.

With reference to FIGS. 5-10 various embodiments have been described for which the first engine unit 100 is a cylinder block, and for which the second engine unit 200 is a turbo unit such as a turbocharger unit. It should however be realized that the principle of having a fastener member 300 to operate the valve 400 could be implemented for various other engine arrangements not relying on the presence of cylinder blocks and turbo units.

Figure 11A:
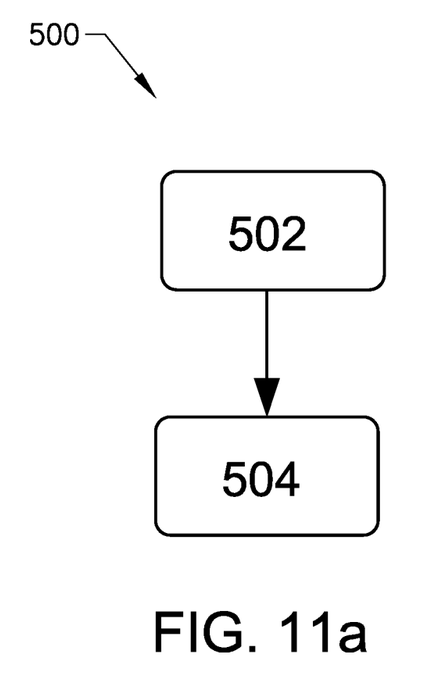
FIGS. 11a-b are schematic views of methods according to various embodiment.

In FIG. 11a a method 500 for opening a valve of an engine arrangement is schematically shown. The engine arrangement comprises a first engine unit 100, a second engine unit 200, and at least one member 300 for fastening the second engine unit 200 to the first engine unit 100 in accordance with the description above. The method 500 comprises aligning, in 502, a fluid port 102 of the first engine unit 102 with a fluid port 202 of the second engine unit (200), and fastening, in 504, the second engine unit 200 to the first engine unit 100 by moving the fastening member 300 relative the first engine unit 100 and the second engine unit 200. In 504, the valve 400 is opened due to movement of the fastening member 300.

Figure 11B:
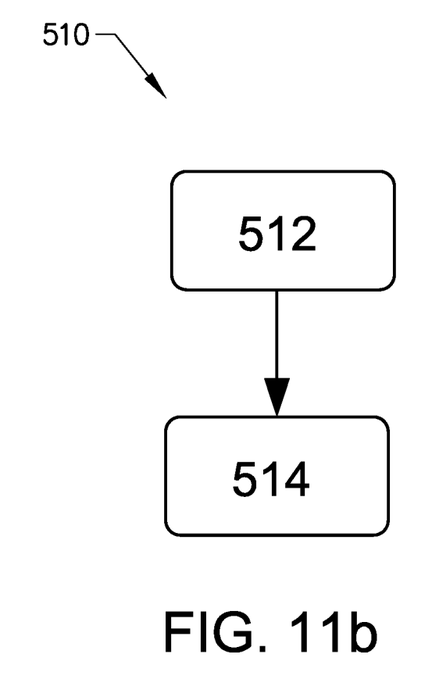

In FIG. 11b method 510 for opening a valve of a turbine arrangement is schematically shown. The turbine arrangement comprises a turbo unit 200, the turbo unit 200 including a turbine shaft 230 supporting a turbine 232, a bearing housing 220 enclosing said turbine shaft 230 and comprising means for fastening the bearing housing 220 to a cylinder block 100 of an associated internal combustion engine 10. The method comprises aligning, in 512, a fluid port 102 of the cylinder block 100 with a fluid port 202 of the bearing housing 220, and opening the valve 400, in 514, by fastening the bearing housing 220 to the cylinder block 100.

It is to be understood that the present invention is not limited to the embodiments described above and illustrated in the drawings; rather, the skilled person will recognize that many changes and modifications may be made within the scope of the appended claims.

The invention claimed is:

1. A turbine arrangement comprising
a turbo unit, the turbo unit including a turbine shaft supporting a turbine, a bearing housing enclosing the turbine shaft, the bearing housing comprising means for fastening the turbo unit to a first engine unit, wherein a fluid port of the bearing housing is configured to be in fluid communication with a fluid port of the first engine unit when the turbo unit is attached to the first engine unit, the fluid being cooling water or lubrication oil, and
a valve for opening and closing at least one of the fluid ports, wherein the valve is configured such that an act of securely attaching the turbo unit to the first engine unit causes the fluid ports to open.

2. The turbine arrangement according to claim 1, wherein the first engine unit is formed by a cylinder block of an associated internal combustion engine.

3. A method for opening a valve of a turbine arrangement according to claim 1, the bearing housing comprising means for fastening the turbo unit to a cylinder block of an associated internal combustion engine, the method comprising:
aligning a fluid port of the cylinder block with a fluid port of the bearing housing, and
opening the valve by fastening the turbo unit to the cylinder block such that the valve ensures that the at least one of the fluid ports is closed unless the turbo unit is securely attached to the cylinder block.

4. The turbine arrangement according to claim 1, wherein the bearing housing comprises a seal.

5. The turbine arrangement according to claim 4, wherein the valve comprises a valve housing having fluid ports wherein a first fluid port of the valve is arranged to be aligned with a fluid port of the first engine unit and a second fluid port of the valve is arranged to be aligned with a fluid port of the turbo unit, and a valve member arranged inside the valve housing and being moveable between an open position and a closed position for controlling fluid flow between the fluid ports of the valve, wherein the valve is configured to ensure that the at least one of the fluid ports is closed unless the turbo unit is securely attached to the first engine unit.

6. The turbine arrangement according to claim 5, wherein the first fluid port of the valve is arranged to be aligned with a fluid port of a cylinder block of an internal combustion engine.

7. The turbine arrangement according to claim 5, wherein the valve member is spring biased towards its closed position.

8. The turbine arrangement according to claim 5, wherein the valve member comprises an engagement surface covering one of the fluid ports when the valve member is in its closed position, and wherein the valve member is arranged to move to its open position when the engagement surface is engaged by means of a protrusive structure of the turbo unit when the turbo unit is inserted into one of the fluid ports.

9. The turbine arrangement according to claim 8, wherein the engagement surface is a flat surface configured to receive a pressing force from the protrusive structure.

10. The turbine arrangement according to claim 9, wherein the valve member is pivotally supported inside the valve housing.

11. The turbine arrangement according to claim 9, wherein the valve member is slidably supported inside the valve housing.

12. The turbine arrangement according to claim 5, wherein the valve member comprises a threaded bore configured to receive a threaded portion of a fastening member.

13. The turbine arrangement according to claim 5, wherein the valve housing comprises means for attaching the valve to the first engine unit.

14. The turbine arrangement according to claim 5, wherein the first fluid port extends from an inlet support surface of the valve housing, the inlet support surface comprises sealing means for providing a fluid tight connection between the first engine unit and the valve.

15. The turbine arrangement according to claim 5, wherein the second fluid port extends from an outlet support surface of the valve housing, the outlet support surface comprises sealing means for providing a fluid tight connection between the turbo unit and the valve.

16. The turbine arrangement according to claim 5, wherein the valve housing is provided with a seal.

17. A turbine arrangement comprising
a turbo unit, the turbo unit including a turbine shaft supporting a turbine, a bearing housing enclosing the turbine shaft, the bearing housing comprising means for fastening the turbo unit to a first engine unit, wherein a fluid port of the bearing housing is configured to be in fluid communication with a fluid port of the first engine unit when the turbo unit is attached to the first engine unit, the fluid being cooling water or lubrication oil, and a valve for opening and closing at least one of the fluid ports, wherein the valve is configured to ensure that the at least one of the fluid ports is closed unless the turbo unit is securely attached to the first engine unit, wherein the bearing housing comprises a protrusive structure being inserted in the fluid port of the first engine unit when the turbo unit is attached to the first engine unit.

18. The turbine arrangement according to claim 17, wherein the protrusive structure is arranged to act on the valve.

19. The turbine arrangement according to claim 17, wherein the protrusive structure is a fastening member for attaching the turbo unit to the first engine unit.

20. A turbine arrangement comprising
a turbo unit, the turbo unit including a turbine shaft supporting a turbine, a bearing housing enclosing the turbine shaft, the bearing housing comprising means for fastening the turbo unit to a first engine unit, wherein a fluid port of the bearing housing is configured to be in fluid communication with a fluid port of the first engine unit when the turbo unit is attached to the first engine unit, the fluid being cooling water or lubrication oil, a valve for opening and closing at least one of the fluid ports, wherein the valve is configured to ensure that the at least one of the fluid ports is closed unless the turbo unit is securely attached to the first engine unit, and at least one member for fastening the turbo unit to the first engine unit, wherein the fastening member is moveably arranged relative to the first unit and the turbo unit and being arranged to act on the valve such that the valve ensures that the at least one of the fluid ports is closed unless the turbo unit is securely attached to the first engine unit.

21. The turbine arrangement according to claim 20, wherein the bearing housing has a surface at which the bearing housing is attached to a cylinder block.

22. The turbine arrangement according to claim 21, wherein the valve is arranged between the cylinder block and the bearing housing.

23. The turbine arrangement according to claim 20, wherein the bearing housing has a surface at which the bearing housing is attached to a cylinder block, and wherein the fastening member extends through the bearing housing.

* * * * *